US012307306B2

(12) United States Patent
Praharaj et al.

(10) Patent No.: US 12,307,306 B2
(45) Date of Patent: May 20, 2025

(54) STANDARDIZED INTERFACE FOR WIDE AREA NETWORK PROGRAMMING

(71) Applicant: Cisco Technology, Inc., San Jose, CA (US)

(72) Inventors: Saswat Praharaj, Pleasanton, CA (US); Fabio R. Maino, Palo Alto, CA (US); Alberto Rodriguez Natal, Leon (ES); Ram Dular Singh, Cupertino, CA (US); Vivek Agarwal, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 17/900,020

(22) Filed: Aug. 31, 2022

(65) Prior Publication Data
US 2024/0069995 A1    Feb. 29, 2024

(51) Int. Cl.
*G06F 9/54*    (2006.01)
(52) U.S. Cl.
CPC .............. *G06F 9/547* (2013.01); *G06F 9/541* (2013.01)
(58) Field of Classification Search
None
See application file for complete search history.

(56) References Cited

U.S. PATENT DOCUMENTS

| | | | | |
|---|---|---|---|---|
| 6,144,996 A | * | 11/2000 | Starnes | ............ H04L 9/40 707/E17.119 |
| 9,740,759 B1 | | 8/2017 | Zhang | |
| 10,992,576 B1 | | 4/2021 | Panchal et al. | |
| 2017/0078410 A1 | | 3/2017 | Rao | |
| 2019/0179805 A1 | | 6/2019 | Prahlad et al. | |

(Continued)

FOREIGN PATENT DOCUMENTS

| EP | 0841612 A2 * 11/1997 |
|---|---|
| WO | WO2014165967    10/2014 |

OTHER PUBLICATIONS

Gifre, et al, "Experimental assessment of inter-datacenter multicast connectivity for ethernet services in flexgrid networks", The European Conference on Optical Communication, Sep. 21, 2014, pp. 1-3.

(Continued)

*Primary Examiner* — Craig C Dorais
(74) *Attorney, Agent, or Firm* — Lee & Hayes, P.C.

(57) ABSTRACT

Techniques for providing a standardized interface that is configured to provide application developers with ways for interacting with different wide area network controllers. A standardized interface may include an application programming interface (API) server that can receive a connectivity request associated with an application that is to be hosted on an application orchestration system. The API server may determine, based at least in part on the connectivity request, a vendor network to be used by the application to send traffic to a remote service. Based at least in part on determining the vendor network, the API server may translate the connectivity request into a first format that is understandable by a controller of the vendor network. The API server may also provide the connectivity request in the first format to the controller of the vendor network such that a path through the vendor network can be determined.

20 Claims, 7 Drawing Sheets

(56) References Cited

U.S. PATENT DOCUMENTS

| | | |
|---|---|---|
| 2019/0297118 A1 | 9/2019 | Haugsnes |
| 2020/0349778 A1* | 11/2020 | Saers .................. G06F 8/65 |
| 2021/0240497 A1* | 8/2021 | Thulasi ................ G06F 9/546 |

OTHER PUBLICATIONS

Lin, et al, "Enabling network function virtualization over heterogeneous resources", IEEE, Sep. 27, 2017, pp. 58-63.

PCT Search Report and Written Opinion mailed Nov. 13, 2023 for PCT Application No. PCT/US2023/029229, 24 pages.

\* cited by examiner

STANDARDIZED INTERFACE FOR WIDE AREA NETWORK PROGRAMMING

TECHNICAL FIELD

The present disclosure relates generally to techniques for, among other things, a standardized interface that is configured to provide application developers with ways for interacting with different wide area network controllers to orchestrate connectivity requests.

BACKGROUND

Modern applications deployed by enterprise information technology (IT) personnel typically have access requirements of external websites, internal services (e.g., hosted in a different geographical location), or other software as a service (SaaS) applications. As such, the use of continuous integration and delivery (CI/CD) tools has become relatively widespread, and these tools allow applications to be deployed with an unprecedented level of agility. However, to interconnect those application components and corresponding dependent services over a wide area network (WAN), DevOps teams must go through manual and tedious processes and approval cycles defined by NetOps and Security teams, thereby constraining the agility of application development. Additionally, WAN products and services are typically vendor controlled and have their own proprietary interfaces, which are different from interfaces of other WAN products and services from other vendors. As such, it would be extremely tedious and operationally infeasible for any application deployment ecosystem to integrate with each of the different WAN vendor controllers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
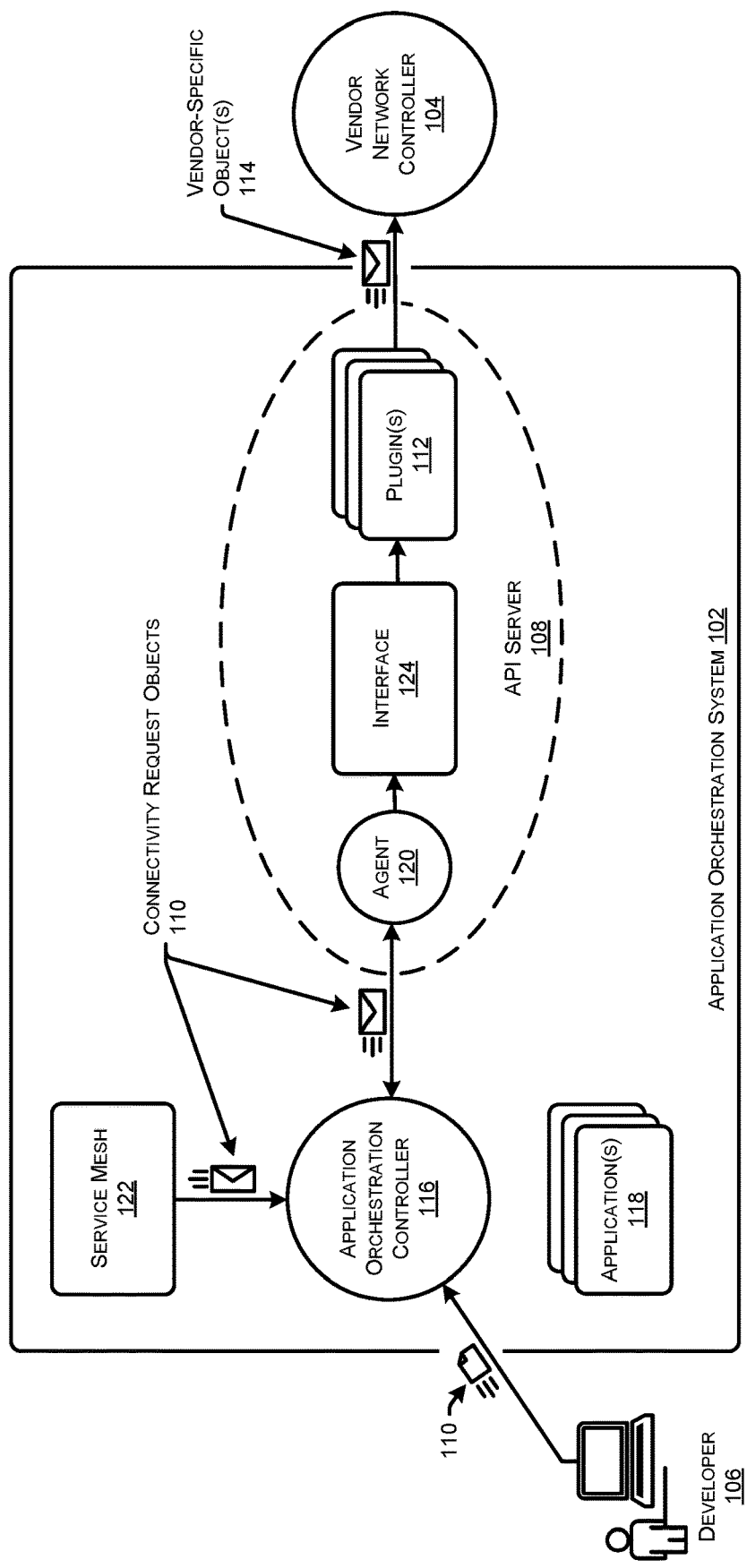
FIG. 1 illustrates an example architecture that may implement various aspects of the technologies described herein.

This disclosure describes various technologies for expressing application connectivity requirements to a network controller (e.g., a software-defined wide area network (SD-WAN) controller) using a standardized interface. By way of example, and not limitation, the standardized interface may include an application programming interface (API) server having at least a processor and a memory. In some examples, the API server may include an interface component that is configured to receive connectivity request(s) associated with application(s) that are capable of being hosted on an application orchestration system. The API server may also include different, vendor-specific plugins associated with different vendor networks. These different, vendor-specific plugins may be configured to translate the connectivity request(s) into different, vendor-specific formats that are understandable by controller(s) of the different vendor networks. For instance, the API server may include a first plugin associated with a first vendor network that is configured to translate a connectivity request into a first format that is understandable by a first controller of the first vendor network, and the API server may also include a second plugin associated with a second vendor network that is configured to translate the connectivity request into a second format that is understandable by a second controller of the second vendor network. In examples, the first format may be incomprehensible by the second controller, and the second format may be incomprehensible by the first controller.

Additionally, the techniques described herein may be performed as a method and/or by a system having non-transitory computer-readable media storing computer-executable instructions that, when executed by one or more processors, perform the techniques described above.

Example Embodiments

As discussed above, modern applications deployed by enterprise information technology (IT) personnel typically have access requirements of external websites, internal services (e.g., hosted in a different geographical location), or other software as a service (SaaS) applications. As such, the use of continuous integration and delivery (CI/CD) tools has become relatively widespread, and these tools allow applications to be deployed with an unprecedented level of agility. However, to interconnect those application components and corresponding dependent services over a wide area network (WAN), DevOps teams must go through manual and tedious processes and approval cycles defined by NetOps and Security teams, thereby constraining the agility of application development. Additionally, WAN products and services are typically vendor controlled and have their own proprietary interfaces, which are different from interfaces of other WAN products and services from other vendors. As such, it would be extremely tedious and operationally infeasible for any application deployment ecosystem to integrate with each of the different WAN vendor controllers.

This application describes, among other things, techniques for expressing application connectivity requirements to a network controller (e.g., a software-defined wide area network (SD-WAN) controller) using a standardized interface. As one example, the technologies described herein include a standardized interface for vendor networks (e.g., SD-WAN controllers) to provide a set of Application Programming Interfaces (APIs) to application developers (e.g., DevOps), so that the developers can interact with vendor-specific network controllers to orchestrate connectivity requests (e.g., which may include server level agreement request objects). In some examples, this standardized interface is a pluggable interface where each vendor network could write a vendor-specific plugin that is capable of communicating with their proprietary network controller.

For example, such a standardized interface for performing the technologies described herein may include an application programming interface (API) server having at least a processor and a memory. In some examples, the API server may include an interface component that is configured to receive connectivity request(s) associated with application(s) that are capable of being hosted on an application orchestration system. The API server may also include different, vendor-specific plugins associated with different vendor networks. These different, vendor-specific plugins may be configured to translate the connectivity request(s) into different, vendor-specific formats that are understandable by controller(s) of the different vendor networks. For instance, the API server may include a first plugin associated with a first vendor network that is configured to translate a connectivity request into a first format that is understandable by a first controller of the first vendor network, and the API server may also include a second plugin associated with a second vendor network that is configured to translate the connectivity request into a second format that is understandable by a second controller of the second vendor network. In examples, the first format may be incomprehensible by the second controller, and the second format may be incomprehensible by the first controller. In examples, once a connectivity request is translated by the vendor-specific plugin(s) connectivity requests may be provided to the controller of the vendor network(s) to determine a best path through the vendor network(s) to a remote service that is to be consumed by the application hosted on the application orchestration system.

As used herein, a "network controller" may include any type of network controller (e.g., SD-WAN Controller, etc.) that, in some instances, is capable of: (i) allowing secure access to domains that are external to the network domain where a source application runs (e.g., an external domain may be a different compute cluster, a website, a web service, SaaS (Software as a Service), an internal service deployed outside of requesting application networking domain, etc.); (ii) establishing different network paths from a given application infrastructure to a remote service that the application is consuming (e.g., a SaaS application); (iii) having internal capabilities, or using a third-party service, to determine a best path to reach the remote service; and/or (iv) dynamically selecting a best path to steer application egress traffic through. In SD-WAN solutions, this is typically called "SaaS Optimization."

Additionally, an "application orchestration system" as used herein may be any type of application orchestration system or container orchestration platform (e.g., Kubernetes, KVM, Openstack, VMWare VCenter, Docker Swarm, Apache Mesos, etc.) that is capable of explicitly defining configuration for application egress traffic. In some examples, this defined configuration may be a part of the general configuration of the application orchestration system itself (e.g., part of some network policies in Kubernetes), can be an ad-hoc configuration in place to handle egress traffic (e.g., in-house solutions), can be part of a component running on the application orchestration system that is capable of handling the egress traffic (e.g., a service mesh, such as Istio, where explicit egress policies can be defined), and/or the like. In some examples, the application orchestration system may have users with privileges to deploy the application itself and tooling to provide connectivity for the application within the application's networking domain.

By way of example, and not limitation, a standardized interface for expressing application connectivity requirements to a network controller may comprise an application programming interface (API) server (also referred to herein as a "WAN interface API server"). In some examples, the API server may include at least a processor and a memory, the memory storing computer-executable instructions that, when executed by the processor, cause the API server to perform the techniques described below and herein. In some examples, the API server may be hosted independently as a web service that is external to an application cluster hosting the application (e.g., an application orchestration system). Additionally, or alternatively, the API server may be hosted within the network controller, where it may run as an independent web service. Additionally, or alternatively, API server may be hosted within the application cluster (e.g., the application orchestration system) as an operator (e.g., a Kubernetes operator), a virtual machine, or the like.

In some examples, the API server may receive standardized connection request object(s) and pass them on to one or more vendor network controller plugin(s) (e.g., a plugin at an SD-WAN controller). The vendor network controller plugin(s) would subsequently convert the connection request object(s) to an object format that its vendor-specific network controller understands. Additionally, the vendor network controller plugin(s) may make subsequent API calls to configure the vendor-specific network controller. In some examples, software running on the API server may also choose to convert the standardized connection request object(s) to vendor-specific controller object formats understandable by the vendor network controllers.

In some examples, standardized connectivity request objects may be sent to an application orchestration controller of the application orchestration system. In some examples, the connectivity request objects may be sent to the application orchestration controller explicitly and/or implicitly. For instance, in the explicit call, an application developer (e.g., DevOps) may use a command line interface to make API calls with explicit connectivity intent for an application specified in a standardized connectivity request object. In the implicit scenario, connectivity intent may be expressed through a network policy object (e.g., a Kubernetes network policy, Open Policy Agent (OPA) network policy, a service mesh egress policy, and/or the like). In such examples, the API server may include an agent that is configured to watch for connection request objects and retrieve the connection request objects from the application orchestration controller. This is an example of an asynchronous mode of communication between the API server and the application orchestration controller. Additionally, or alternatively, the application orchestration controller may also make a synchronous API call to the API server when the connection request object is received either explicitly or implicitly.

In some examples, an application developer's (e.g., DevOps) intent for external connectivity may be derived from metadata associated with a pod, virtual machine, bare metal server, or the like. In this case, the API server may watch the application orchestration controller for predefined labels in pods, virtual machines, network objects, or the like. The API server may convert the intent expressed in the labels/metadata to a connectivity request object format and pass it to a vendor network controller.

In any of the above examples, information (e.g., source subnet information, application metadata, compute cluster information, destination fully qualified domain name of a service, destination internet protocol address of the service, SaaS, port information, and/or the like) may be eventually passed to network infrastructure controllers, such as an SD-WAN controller, in a format that the controller understands. In this way, the information passed to the network controller may be used to, among other things, configure router(s) to allow traffic to specified destinations from a set of source networks, establish, monitor, and/or select different paths for application egress traffic towards remote services so that service level agreements may be met, and/or the like.

In some examples, the technologies disclosed herein include a mechanism to express to an application orchestration controller external connectivity requirements of an application using objects written in various markup languages, such as JSON, YAML, XML, and/or other markup languages. In some examples, a connectivity request may also be implicitly expressed as metadata associated with a workload and consumed by the API server. In some examples, such a workload may be running inside a Kubernetes pod, virtual machine, IoT (Internet of Things) devices, or bare metal servers.

In some examples, the technologies disclosed herein may also include a mechanism to talk to the API server, which may be hosted within the application domain and which may translate the connectivity requests objects to vendor-specific network controller API objects. In some examples, application administrators (e.g., DevOps) may directly invoke the API server interface using a command line interface, or indirectly via the application orchestration controller. In the indirect method, the API server may be invoked synchronously, or asynchronously through the application orchestration controller.

In some examples, the technologies disclosed herein may also include a mechanism for the application orchestration controller and the API server, working in tandem, to implicitly create connectivity requests/connectivity request objects as connectivity requests originate from entities such as a service mesh, egress gateway, a Kubernetes network policy, or the like. In some examples, the API server may expose an application wide area network (WAN) interface to the caller and allow vendor network controllers to write loosely (e.g., multiple processes) and/or or tightly coupled (e.g., single process) software to translate connectivity request objects to vendor specific connection objects.

In some examples, the API server may include an interface component. The interface component may be configured to receive a connectivity request associated with an application that is (i) being hosted, (ii) to be hosted, and/or (iii) capable of being hosted on the application orchestration system. In some examples, application developers may talk to the API server via the interface component to make connectivity request objects. That is, the interface component may receive the connectivity request object from a computing device associated with a developer of the application, who may provide the connectivity request object using a command line interface. Additionally, or alternatively, the interface component may receive connectivity request objects from the application orchestration controller of the application orchestration system.

In some examples, the API server may also include different, vendor-specific plugins associated with respective vendor networks. These different, vendor-specific plugins may be configured to translate the connectivity request(s) into different, vendor-specific formats that are understandable by controller(s) of the different vendor networks. For instance, the API server may include a first plugin associated with a first vendor network that is configured to translate a connectivity request object into a first format that is understandable by a first controller of the first vendor network, and the API server may also include a second plugin associated with a second vendor network that is configured to translate the connectivity request into a second format that is understandable by a second controller of the second vendor network. In one example, the API server may include a different plugin for each different vendor network because, in some examples, the vendor specific formats may be incomprehensible by other vendor network controllers.

In some examples, after translating a connectivity request object into a vendor-specific format, the API server may provide the translated connectivity request to the vendor network controller(s). As such, the vendor network controller(s) may establish connection(s) over their respective vendor network for traffic associated with the application(s) based at least in part on the connectivity request being translated into the correct format. In some examples, the traffic associated with the application(s) may be egress traffic of the application(s) that is to be sent over the vendor network to a service. In some examples, the vendor networks may be software-defined wide area networks (SD-WAN), multiprotocol label switched networks (MPLS), or other wide area network technologies.

According to the technologies disclosed herein, several advantages in computer-related technology may be realized. For instance, the standardized interface technologies disclosed herein allow users (e.g., application developers, DevOps, etc.) to make API calls to a single interface using a single data model, instead of integrating with the interfaces of proprietary vendor network controllers, which is impractical. This also allows users to provision wide area network connectivity regardless of the specific vendor network, which promotes competition among wide area network vendors. These and other improvements will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein. The architecture 100 includes an application orchestration system 102, a vendor network controller 104, and a developer 106 (e.g., an application developer or DevOps personnel). The application orchestration system 102 may be any type of application or container orchestration system, such as Kubernetes, KVM, Openstack, VMWare VCenter, Docker Swarm, Apache Mesos, or the like. The vendor network controller 104 may monitor, control, and/or establish flows through a vendor network, which may be a wide area network (e.g., SD-WAN, MPLS network, etc.). In some examples, the vendor network controller 104 may be a software defined networking (SDN) controller.

The architecture 100 also includes an API server 108, which may represent the API server (e.g., application WAN interface API) described herein. In some examples, the API server 108 may include at least a processor and a memory, the memory storing computer-executable instructions that, when executed by the processor, cause the API server 108 to perform the techniques described below and herein. In the example shown in FIG. 1, the API Server 108 is hosted within the application orchestration system 102 (e.g., as an operator, a virtual machine, a function, or the like).

In some examples, the API Server 108 may receive standardized connectivity request object(s) 110 and pass them on to one or more vendor network controller plugin(s) 112 (e.g., a plugin at an SD-WAN controller). The vendor network controller plugin(s) 112 would subsequently convert the connectivity request object(s) 110 to an object format that its vendor-specific network controller understands. Additionally, the vendor network controller plugin(s) 112 may make subsequent API calls to configure the vendor-specific network controller 104. In some examples, the plugin(s) 112 or other software running on the API Server 108 may also choose to convert the standardized connectivity request object(s) 110 to vendor-specific object(s) 114 understandable by the vendor network controller 104.

In some examples, standardized connectivity request object(s) 110 may be sent to an application orchestration controller 116 of the application orchestration system 102. In some examples, the connectivity request object(s) 110 may be sent to the application orchestration controller 116 explicitly and/or implicitly. For instance, in the explicit call, an application developer 106 (e.g., DevOps) may use a command line interface to make API calls with explicit connectivity intent for application(s) 118 specified in a standardized connectivity request object 110. In the implicit scenario, connectivity intent may be expressed through a network policy object (e.g., a Kubernetes network policy, Open Policy Agent (OPA) network policy, a service mesh egress policy, and/or the like). In such examples, the API Server 108 may include an agent 120 that is configured to watch for connectivity request object(s) 110 and retrieve the connectivity request object(s) 110 from the application orchestration controller 116. This is an example of an asynchronous mode of communication between the API Server 108 and the application orchestration controller 116. Additionally, or alternatively, the application orchestration controller 116 may also make a synchronous API call to the API Server 108 when the connectivity request object(s) 110 is/are received either explicitly or implicitly.

In some examples, an application developer's 106 (e.g., DevOps) intent for external connectivity may be derived from metadata associated with an application 118, a pod, virtual machine, bare metal server, or the like. In this case, the API Server 108 may watch the application orchestration controller 116 for predefined labels in pods, virtual machines, network objects, application(s) 118, or the like. The API Server 108 may convert the intent expressed in the labels/metadata to the standardized connectivity request object 110 format and pass it to a vendor network controller 104 or plugin 112.

In any of the above examples, information (e.g., source subnet information, application metadata, compute cluster information, destination fully qualified domain name of a service, destination internet protocol address of the service, SaaS, port information, and/or the like) may be eventually passed to the vendor network controller 104 in the vendor-specific object 114 format that the controller 104 understands. In this way, the information passed to the vendor network controller 104 may be used to, among other things, configure router(s) of the vendor WAN to allow traffic to specified destinations from a set of source networks, establish, monitor, and/or select different paths for application 118 egress traffic towards remote services so that service level agreements may be met, and/or the like.

In some examples, the technologies disclosed herein include a mechanism to express to an application orchestration controller 116 external connectivity requirements of an application 118 using connectivity request objects 110 written in various markup languages, such as JSON, YAML, XML, and/or other markup languages. In some examples, a connectivity request may also be implicitly expressed as metadata associated with a workload and consumed by the API Server 108. In some examples, such a workload may be running inside a Kubernetes pod, virtual machine, IoT (Internet of Things) devices, or bare metal servers.

In some examples, the technologies disclosed herein may also include a mechanism to talk to the API Server 108, which may be hosted within the application domain and which may translate the connectivity request objects 110 to vendor-specific objects 114 (e.g., vendor-specific network controller API objects). In some examples, application developers 106 (e.g., DevOps, administrators, etc.) may directly invoke the API Server 108 interface using a command line interface, or indirectly via the application orchestration controller 116. In the indirect method, the API Server 108 may be invoked synchronously, or asynchronously through the application orchestration controller 116.

In some examples, the technologies disclosed herein may also include a mechanism for the application orchestration controller 116 and the API Server 108, working in tandem, to implicitly create connectivity requests/connectivity request object(s) 110 as connectivity requests originate from entities such as a service mesh 122, egress gateway, a Kubernetes network policy, or the like. In some examples, the API Server 108 may expose an application wide area network (WAN) interface 124 to the caller and allow vendor network controllers 104 to write loosely (e.g., multiple processes) and/or or tightly coupled (e.g., single process) software to translate connectivity request object(s) 110 to vendor-specific connection object(s) 114.

In some examples, the API Server 108 may include an interface component 124. The interface component may be configured to receive a connectivity request object(s) 110 associated with the application(s) 118 that are (i) being hosted, (ii) to be hosted, and/or (iii) capable of being hosted on the application orchestration system 102. In some examples, application developers 106 may talk to the API Server 108 via the interface component 124 to send connectivity request object(s) 110. That is, the interface component 124 may receive the connectivity request object(s) 110, in some instances, directly from a computing device associated with a developer 106 of the application(s) 118, who may provide the connectivity request object(s) 110 using a command line interface. Additionally, or alternatively, the interface component 124 may receive connectivity request object(s) 110 from the application orchestration controller 116 of the application orchestration system 102.

In some examples, the API Server 108 may also include the different, vendor-specific plugin(s) 112 associated with respective vendor networks. These different, vendor-specific plugin(s) 112 may be configured to translate the standardized connectivity request object(s) 110 into different, vendor-specific object 114 formats that are understandable by different vendor network controllers 104 of different vendor networks. For instance, the API Server 108 may include a first plugin 112 associated with a first vendor network that is configured to translate a connectivity request object into a first format that is understandable by a first controller of the first vendor network, and the API Server 108 may also include a second plugin 112 associated with a second vendor network that is configured to translate the connectivity request into a second format that is understandable by a second controller of the second vendor network, and so forth (e.g., three, four, five, etc. vendor network plugins). In one example, the API Server 108 may include a different plugin 112 for each different vendor network because, in some examples, the vendor-specific connection object formats may be incomprehensible by other vendor network controllers.

In some examples, the API server 108 may determine a respective vendor network that a connectivity request object 110 is to be sent to based at least in part on information included in the connectivity request object 110, such as destination IP address, a fully qualified domain name of the destination, or the like. After determining where the connectivity request is to be sent, the API server 108 may cause the connectivity request object 110 to be translated to the vendor-specific object 114 format associated with that vendor network. The vendor-specific object 114 may then be sent or otherwise provided to the vendor network controller 104 of that vendor network so that the controller may determine and/or establish a path through that vendor network for traffic from an application 118 associated with the connectivity request.

In some examples, after translating a connectivity request object into a vendor-specific format, the API Server 108 may provide the translated connectivity request object to the vendor network controller 104. As such, the vendor network controller 104 may establish connection(s) over their respective vendor WAN network for traffic associated with the application(s) 118 based at least in part on the connectivity request being translated into the correct format. In some examples, the traffic associated with the application(s) 118 may be egress traffic of the application(s) that is to be sent over the vendor network to a service. In some examples, the vendor networks may be software-defined wide area networks (SD-WAN), multiprotocol label switched networks (MPLS), or other wide area network technologies.

Figure 2:
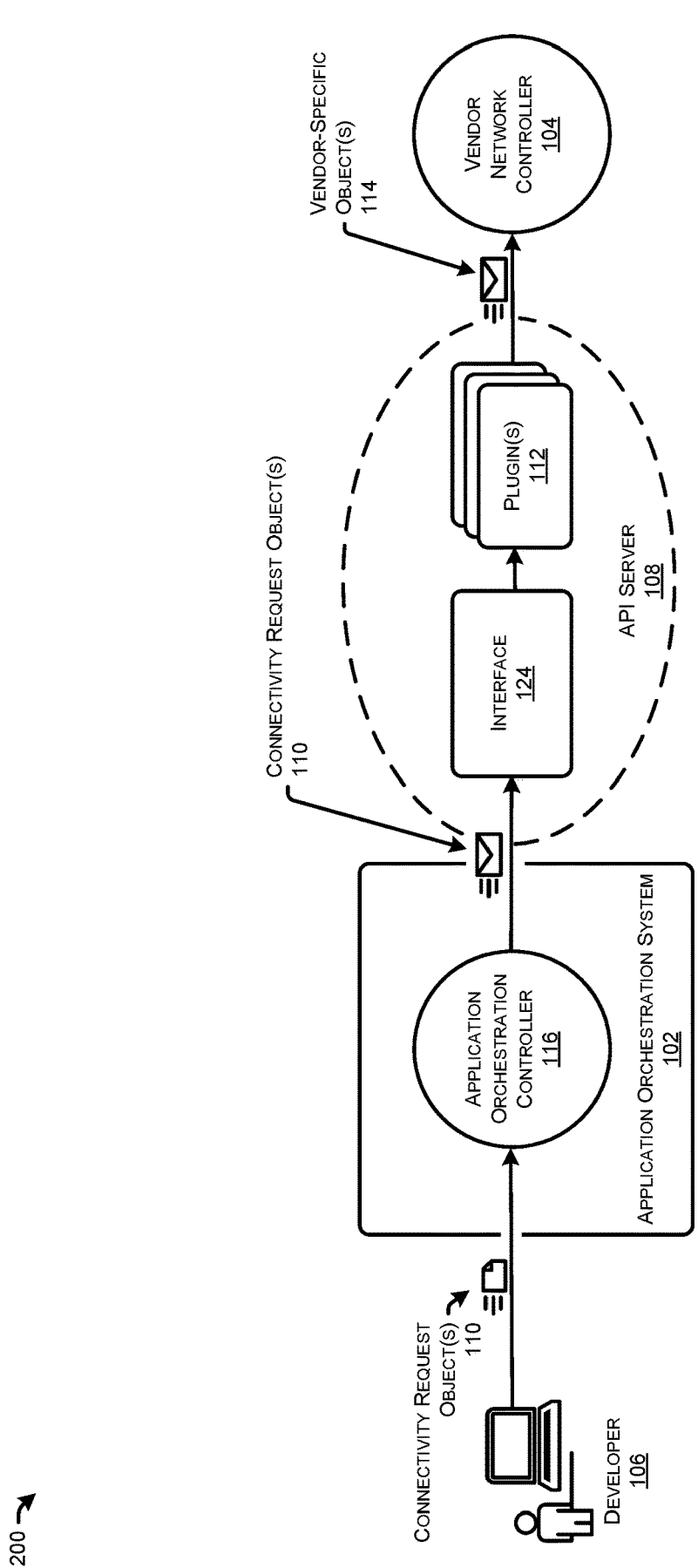
FIG. 2 illustrates another example architecture that may implement various aspects of the technologies described herein.

FIG. 2 illustrates another example architecture 200 that may implement various aspects of the technologies described herein. In the example shown in FIG. 2, the API server 108 is hosted independently as a web service that is external to the application orchestration system 102. Additionally, or alternatively, the API server 108 may be hosted within the vendor network controller 104, where it may run as an independent web service.

In some examples, the API Server 108 may receive standardized connectivity request object(s) 110 and pass them on to one or more vendor network controller plugin(s) 112 (e.g., a plugin at an SD-WAN controller). The vendor network controller plugin(s) 112 may subsequently convert the connectivity request object(s) 110 to an object format that its vendor-specific network controller 104 understands. Additionally, the vendor network controller plugin(s) 112 may make subsequent API calls to configure the vendor-specific network controller 104. In some examples, the plugin(s) 112 or other software running on the API Server 108 may also choose to convert the standardized connectivity request object(s) 110 to vendor-specific object(s) 114 understandable by the vendor network controller 104.

In some examples, standardized connectivity request object(s) 110 may be sent to an application orchestration controller 116 of the application orchestration system 102. In some examples, the connectivity request object(s) 110 may be sent to the application orchestration controller 116 explicitly and/or implicitly. For instance, an application developer 106 (e.g., DevOps) may send a standardized connectivity request object 110 to the application orchestration controller 116. Additionally, in such examples, the application orchestration controller 116 may make a synchronous API call to the API Server 108 when the connectivity request object(s) 110 is/are received from the developer 106.

In some examples, an application developer's 106 (e.g., DevOps) intent for external connectivity may be derived from metadata associated with an application, a pod, virtual machine, bare metal server, or the like. In this case, the API Server 108 may watch the application orchestration controller 116 for predefined labels in pods, virtual machines, network objects, application(s), or the like. The API Server 108 may convert the intent expressed in the labels/metadata to the standardized connectivity request object 110 format and pass it to a vendor network controller 104 or plugin 112.

In any of the above examples, information (e.g., source subnet information, application metadata, compute cluster information, destination fully qualified domain name of a service, destination internet protocol address of the service, SaaS, port information, and/or the like) may be eventually passed to the vendor network controller 104 in the vendor-specific object 114 format that the controller 104 understands. In this way, the information passed to the vendor network controller 104 may be used to, among other things, configure router(s) of the vendor WAN to allow traffic to specified destinations from a set of source networks, establish, monitor, and/or select different paths for application egress traffic towards remote services so that service level agreements may be met, and/or the like.

In some examples, the application orchestration controller 116 and the API Server 108 may work in tandem to implicitly create connectivity requests/connectivity request object(s) 110 as connectivity requests originate from various entities (e.g., a service mesh, egress gateway, a Kubernetes network policy, or the like). In some examples, the API Server 108 may expose an application wide area network (WAN) interface 124 to the caller and allow vendor network controllers 104 to write loosely (e.g., multiple processes) and/or or tightly coupled (e.g., single process) software to translate connectivity request object(s) 110 to vendor-specific connection object(s) 114.

In some examples, the API Server 108 may include an interface component 124. The interface component may be configured to receive a connectivity request object(s) 110 associated with the application(s) that are (i) being hosted, (ii) to be hosted, and/or (iii) capable of being hosted on the application orchestration system 102. In some examples, the interface component 124 may receive connectivity request object(s) 110 from the application orchestration controller 116 of the application orchestration system 102, the connectivity request object(s) 110 provided to the application orchestration controller 116 by the developer 106.

In some examples, the API Server 108 may also include the different, vendor-specific plugin(s) 112 associated with respective vendor networks. These different, vendor-specific plugin(s) 112 may be configured to translate the standardized connectivity request object(s) 110 into different, vendor-specific object 114 formats that are understandable by different vendor network controllers 104 of different vendor networks. For instance, the API Server 108 may include a first plugin 112 associated with a first vendor network that is configured to translate a connectivity request object into a first format that is understandable by a first controller of the first vendor network, and the API Server 108 may also include a second plugin 112 associated with a second vendor network that is configured to translate the connectivity request into a second format that is understandable by a second controller of the second vendor network, and so forth (e.g., three, four, five, etc. vendor network plugins). In one example, the API Server 108 may include a different plugin 112 for each different vendor network because, in some examples, the vendor-specific connection object formats may be incomprehensible by other vendor network controllers.

In some examples, the API server 108 may determine a respective vendor network that a connectivity request object 110 is to be sent to based at least in part on information included in the connectivity request object 110, such as destination IP address, a fully qualified domain name of the destination, or the like. After determining where the connectivity request is to be sent, the API server 108 may cause the connectivity request object 110 to be translated to the vendor-specific object 114 format associated with that vendor network. The vendor-specific object 114 may then be sent or otherwise provided to the vendor network controller 104 of that vendor network so that the controller may determine and/or establish a path through that vendor network for traffic from an application associated with the connectivity request.

In some examples, after translating a connectivity request object into a vendor-specific format, the API Server 108 may provide the translated connectivity request object to the vendor network controller 104. As such, the vendor network controller 104 may establish connection(s) over their respective vendor WAN network for traffic associated with the application(s) based at least in part on the connectivity request being translated into the correct format. In some examples, the traffic associated with the application(s) may be egress traffic of the application(s) that is to be sent over the vendor network to a service. In some examples, the vendor networks may be software-defined wide area networks (SD-WAN), multiprotocol label switched networks (MPLS), or other wide area network technologies.

Figure 3:
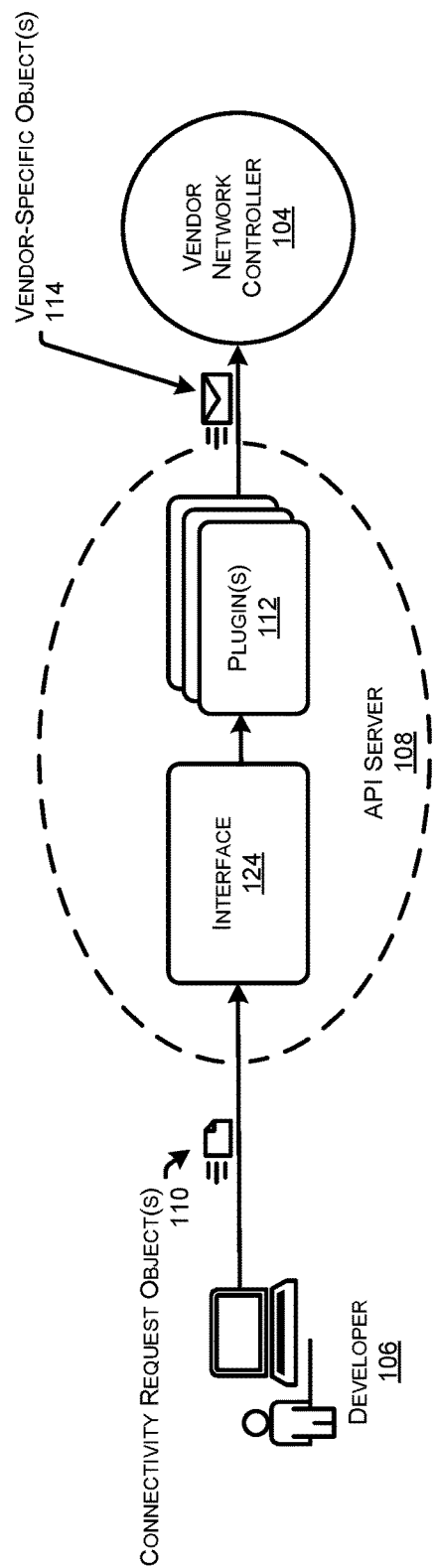
FIG. 3 illustrates yet another example architecture that may implement various aspects of the technologies described herein.

FIG. 3 illustrates yet another example architecture 300 that may implement various aspects of the technologies described herein. In the example architecture 300, the API server 108 is hosted independently as a web service that is external to an application orchestration system. Additionally, or alternatively, the API server 108 may be hosted within the vendor network controller 104, where it may run as an independent web service.

In some examples, standardized connectivity request object(s) 110 may be sent to the API server 108 (or to the interface component 124 of the API server 108) by the developer 106. For instance, the developer 106 (e.g., DevOps) may use a command line interface to make API calls with explicit connectivity intent for application(s) specified in standardized connectivity request object(s) 110. That is, in some examples, the application developers 106 (e.g., DevOps, administrators, etc.) may directly invoke the API Server 108 interface using a command line interface.

In some examples, the API Server 108 may include an interface component 124. The interface component may be configured to receive the connectivity request object(s) 110. In some examples, application developers 106 may talk to the API Server 108 via the interface component 124 to send connectivity request object(s) 110. That is, the interface component 124 may receive the connectivity request object(s) 110, in some instances, directly from a computing device associated with a developer 106 of the application(s), who may provide the connectivity request object(s) 110 using the command line interface.

In some examples, the API Server 108 may also include the different, vendor-specific plugin(s) 112 associated with respective vendor networks. These different, vendor-specific plugin(s) 112 may be configured to translate the standardized connectivity request object(s) 110 into different, vendor-specific object 114 formats that are understandable by different vendor network controllers 104 of different vendor networks. For instance, the API Server 108 may include a first plugin 112 associated with a first vendor network that is configured to translate a connectivity request object into a first format that is understandable by a first controller of the first vendor network, and the API Server 108 may also include a second plugin 112 associated with a second vendor network that is configured to translate the connectivity request into a second format that is understandable by a second controller of the second vendor network, and so forth (e.g., three, four, five, etc. vendor network plugins). In one example, the API Server 108 may include a different plugin 112 for each different vendor network because, in some examples, the vendor-specific connection object formats may be incomprehensible by other vendor network controllers.

In some examples, the API server 108 may determine a respective vendor network that a connectivity request object 110 is to be sent to based at least in part on information included in the connectivity request object 110, such as destination IP address, a fully qualified domain name of the destination, or the like. After determining where the connectivity request is to be sent, the API server 108 may cause the connectivity request object 110 to be translated to the vendor-specific object 114 format associated with that vendor network. The vendor-specific object 114 may then be sent or otherwise provided to the vendor network controller 104 of that vendor network so that the controller may determine and/or establish a path through that vendor network for traffic from an application associated with the connectivity request.

In some examples, after translating a connectivity request object into a vendor-specific format, the API Server 108 may provide the translated connectivity request object to the vendor network controller 104. As such, the vendor network controller 104 may establish connection(s) over their respective vendor WAN network for traffic associated with the application(s) based at least in part on the connectivity request being translated into the correct format. In some examples, the traffic associated with the application(s) may be egress traffic of the application(s) that is to be sent over the vendor network to a service. In some examples, the vendor networks may be software-defined wide area networks (SD-WAN), multiprotocol label switched networks (MPLS), or other wide area network technologies.

Figure 4:
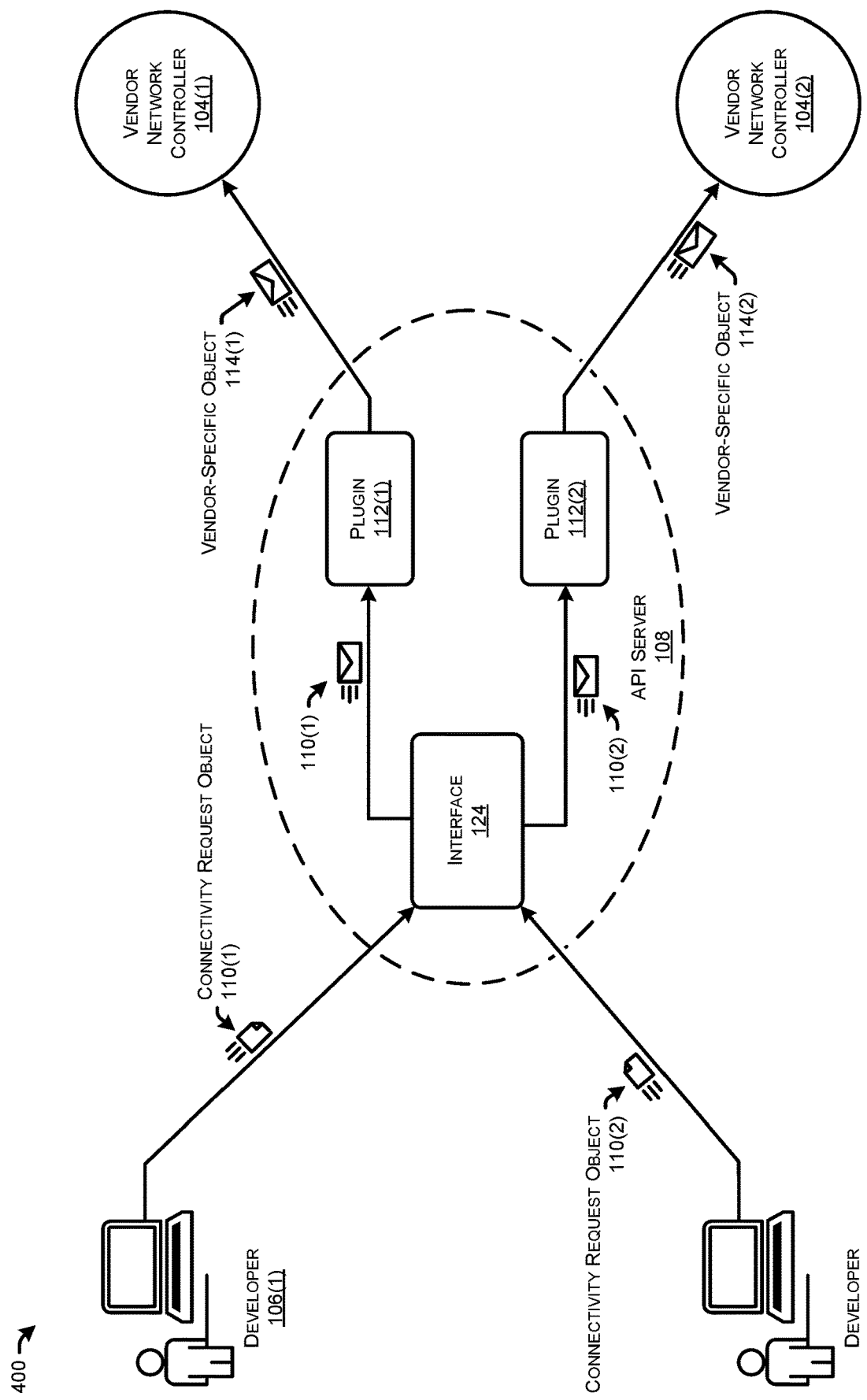
FIG. 4 illustrates a data flow associated with translating connectivity requests from a standardized object format to vendor-specific object formats.

FIG. 4 illustrates a data flow 400 associated with translating connectivity request objects from a standardized object format to vendor-specific object formats. For instance, the interface 124 of the API server 108 may receive a first connectivity request object 110(1) from a first developer 106(1) and may receive a second connectivity request object 110(2) from a second developer 106(2).

In examples, the interface 124 may determine that the first connectivity request object 110(1) is to be sent to a first vendor network controller 104(1) and that the second connectivity request object 110(2) is to be sent to a second vendor network controller 104(2), each associated with different vendor WAN networks. As such, the interface component 124 may cause the first connectivity request object 110(1) to be translated by a first plugin 112(1) such that the first connectivity request object 110(1) is translated into a first vendor-specific object 114(1) format that is understandable by the first vendor network controller 104(1). Additionally, the interface component 124 may cause the second connectivity request object 110(2) to be translated by a second plugin 112(2) such that the second connectivity request object 110(2) is translated into a second vendor-specific object 114(2) format that is understandable by the second vendor network controller 104(2).

Figure 5:
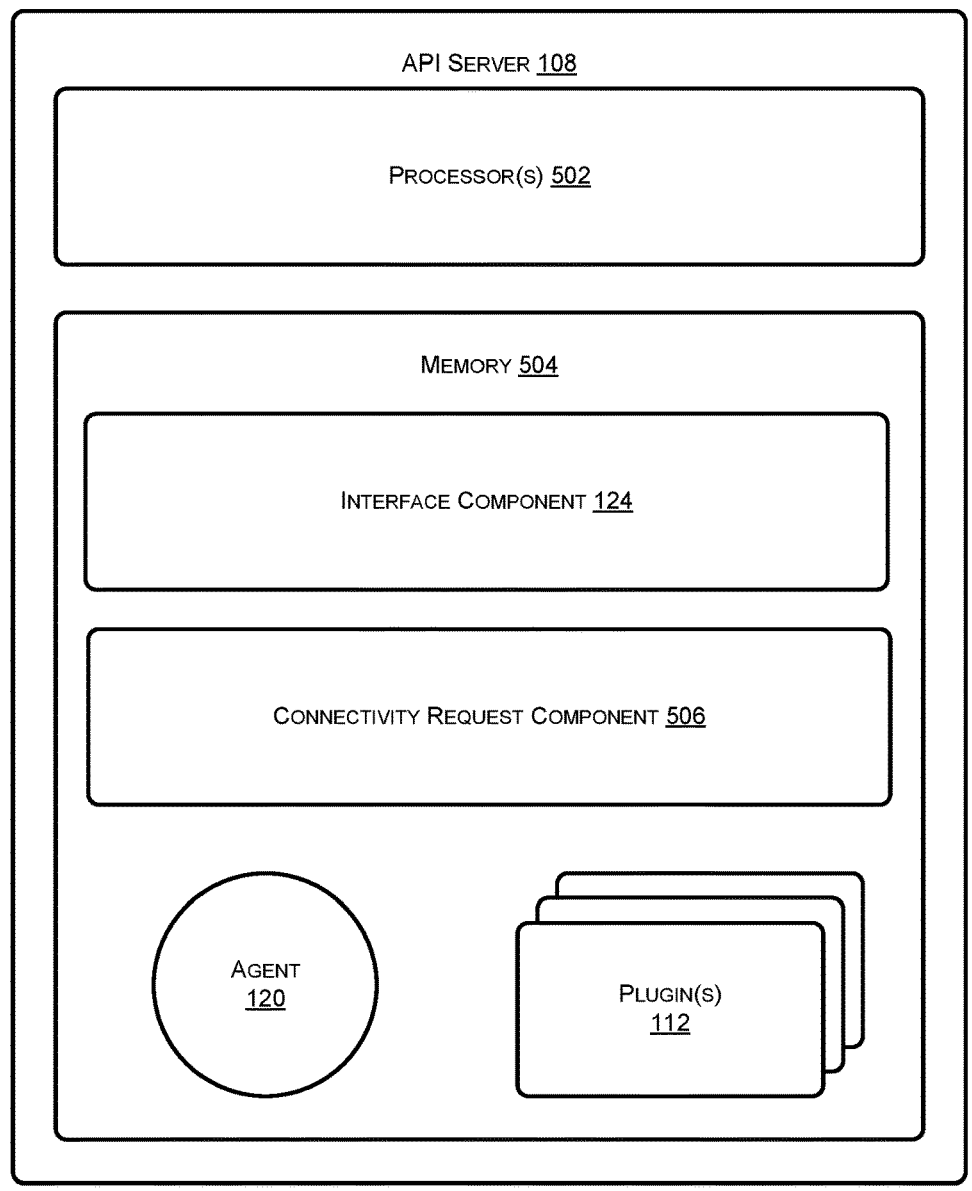
FIG. 5 is a block diagram illustrating example detail of an example API server.

FIG. 5 is a block diagram illustrating example detail 500 of an example API server 108. The API server 108 may include one or more processor(s) 502 and memory 504 that may be communicatively coupled to the one or more processor(s) 502. In some examples, the memory 504 may store the interface component 124, a connectivity request component 124, the vendor-specific plugin(s) 112, and the agent component 120.

In some examples, the connectivity request component 506 may be configured to convert an intent expressed in labels/metadata associated with an application to a connectivity request object format. For instance, a connectivity request may be implicitly expressed as metadata associated with a workload and consumed by the API server 108, and the connectivity request component may generate a connectivity request object to be sent to the plugin(s) 112 for translation into a vendor-specific object format. In some examples, the connectivity request component 506 may work in tandem with an application orchestration controller to implicitly create connectivity requests/connectivity request objects as connectivity requests originate from entities such as a service mesh, egress gateway, a Kubernetes network policy, or the like.

Figure 6:
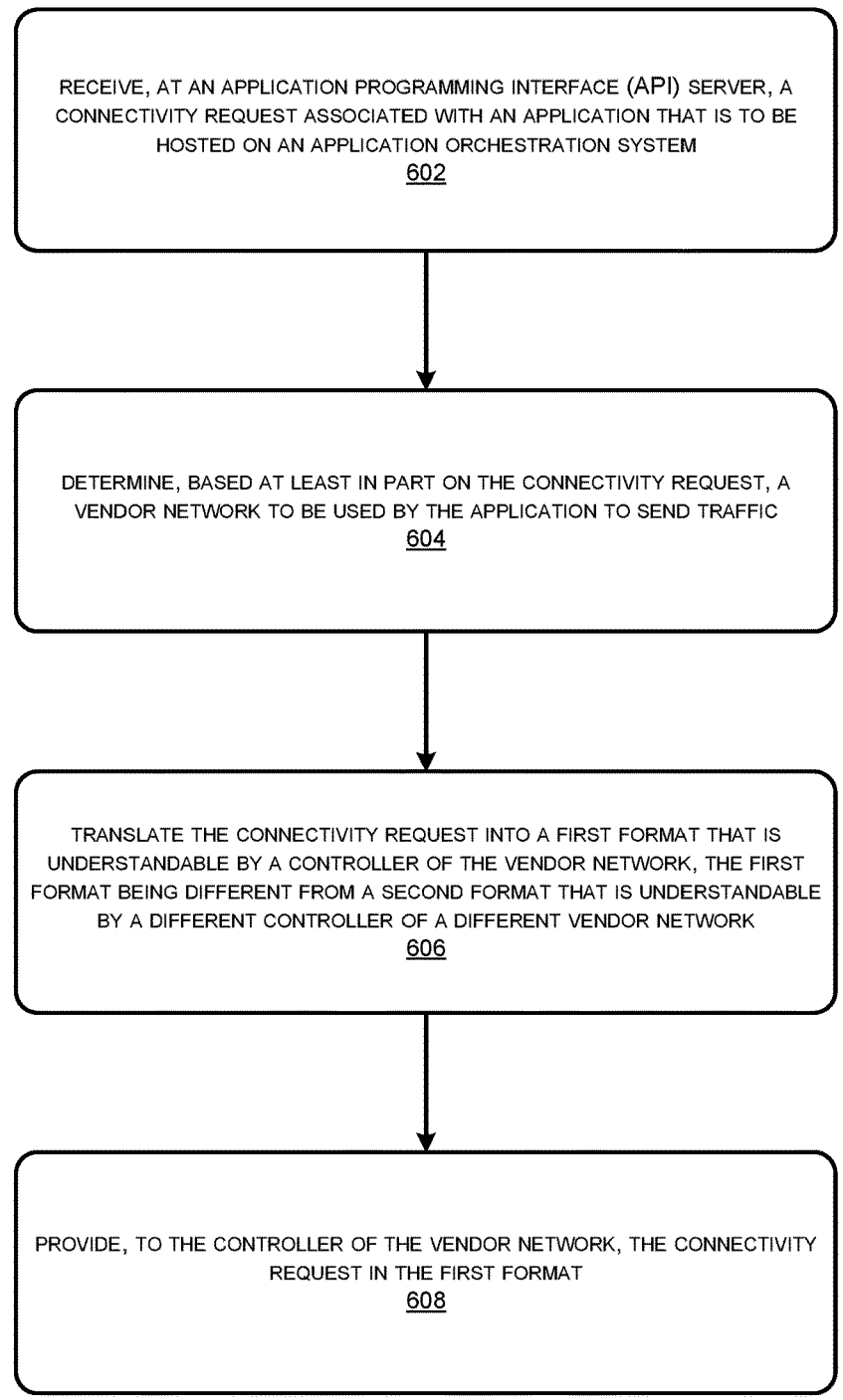
FIG. 6 is a flow diagram illustrating an example method associated with expressing application connectivity requirements to a network controller using a standardized interface.

FIG. 6 is a flow diagram illustrating an example method 600 associated with expressing application connectivity requirements to a network controller using a standardized interface. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 600 begins at operation 602, which includes receiving, at an application programming interface (API) server, a connectivity request associated with an application that is to be hosted on an application orchestration system. For instance, the API server 108 (or the agent 120 or the interface 124 of the API server 108) may receive the connectivity request object 110 associate with the application 118 that is to be hosted on the application orchestration system 102.

At operation 604, the method 600 includes determining, based at least in part on the connectivity request, a vendor network to be used by the application to send traffic. For instance, the API server 108 (or the interface 124, a vendor network determination component, etc.) may determine the vendor network to be used by the application 118 to send traffic to a remote service. In some examples the traffic may be egress traffic of the application, and the vendor network may be determined based on information included in the connectivity request.

At operation 606, the method 600 includes translating the connectivity request into a first format that is understandable by a controller of the vendor network, the first format being different from a second format that is understandable by a different controller of a different vendor network. For instance, the API server 108 (or one or more of the plugin(s) 112) may translate the connectivity request object 110 into a vendor-specific object 114 format that is understandable by the vendor network controller 104.

At operation 608, the method 600 includes providing, to the controller of the vendor network, the connectivity request in the first format. For instance, the API server 108 (or the plugin(s) 112) may provide the connectivity request in the vendor-specific format to the vendor network controller 104.

Figure 7:
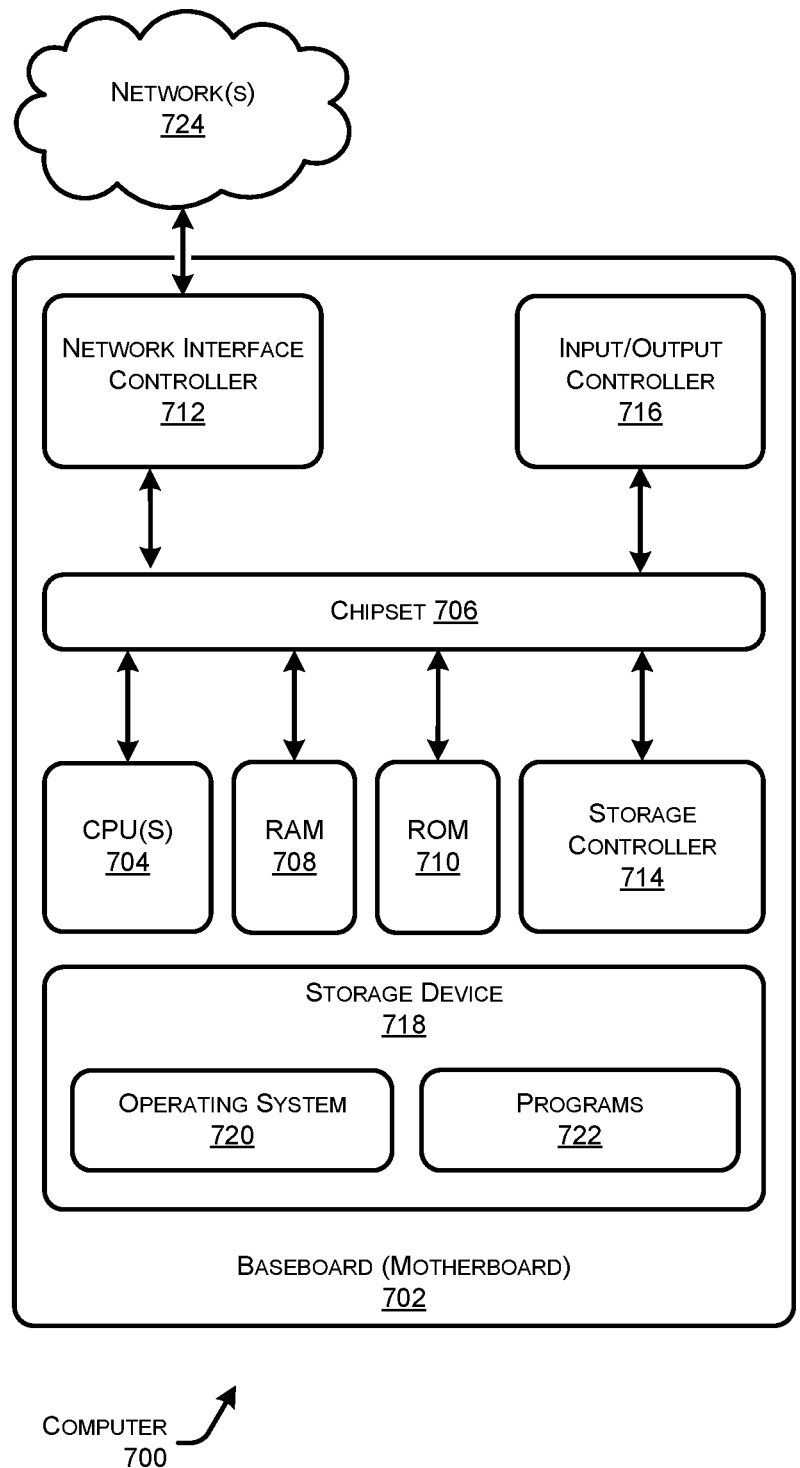
FIG. 7 is a computer architecture diagram showing an illustrative computer hardware architecture for implementing a computing device that can be utilized to implement aspects of the various technologies presented herein.

FIG. 7 is a computer architecture diagram showing an illustrative computer hardware architecture for implementing a computing device that can be utilized to implement aspects of the various technologies presented herein. The computer architecture shown in FIG. 7 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer

700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the vendor network, the application orchestration system 102, a wide area network (e.g., SD-WAN), or the like. The chipset 706 can include functionality for providing network connectivity through a NIC 712, such as a gigabit Ethernet adapter. The NIC 712 is capable of connecting the computer 700 to other computing devices over the network 724. It should be appreciated that multiple NICs 712 can be present in the computer 700, connecting the computer to other types of networks and remote computer systems. In some examples, the NIC 712 may be configured to perform at least some of the techniques described herein.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by the architecture 100 and or any components included therein, may be supported by one or more devices similar to computer 700. Stated otherwise, some or all of the operations performed by the architecture 100, and or any components included therein, may be performed by one or more computer devices 700 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes and functionality described above with regard to FIGS. 1-6, and herein. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

The computer 700 may include one or more hardware processors (processors) configured to execute one or more stored instructions. The processor(s) may comprise one or more cores. Further, the computer 700 may include one or more network interfaces configured to provide communications between the computer 700 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for expressing application connectivity requirements to a network controller using a standardized interface.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An application programming interface (API) server comprising:
    at least a processor and a memory;
    an agent that is configured to monitor an application orchestration controller of an application orchestration system for received connection request objects;
    an interface component that is configured to receive, from the agent, a connectivity request associated with an application that is capable of being hosted on an application orchestration system; and
    a first plugin associated with a first vendor network, the first plugin configured to translate the connectivity request into a first format that is understandable by a first controller of the first vendor network, the first format being different from a second format that is understandable by a second controller of a second vendor network that is different from the first vendor network.

2. The API server of claim 1, further comprising a second plugin associated with the second vendor network, the second plugin configured to translate the connectivity request into the second format.

3. The API server of claim 1, wherein the API server is hosted as a web service that is external to the application orchestration system.

4. The API server of claim 1, wherein the API server is accessible as an independent web service that is hosted within at least one of the first controller or the second controller.

5. The API server of claim 1, wherein the API server is hosted within the application orchestration system as at least one of an operator or a virtual machine.

6. The API server of claim 1, wherein the first controller establishes a connection over the first vendor network for traffic associated with the application based at least in part on the connectivity request being translated into the first format.

7. The API server of claim 6, wherein the traffic is egress traffic of the application that is to be sent over the first vendor network to a service relied upon by the application.

8. The API server of claim 1, wherein the first vendor network is a software-defined wide area network and the first controller is a software-defined networking controller.

9. The API server of claim 1, wherein the connectivity request is received, by the interface component, from at least one of a computing device associated with a developer of the application or the application orchestration controller of the application orchestration system.

10. A method comprising:
    receiving, at an application programming interface (API) server, a connectivity request associated with an application that is to be hosted on an application orchestration system, wherein the request is received from an agent of the API server that is configured to monitor a controller of the application orchestration system for received connection request objects;
    determining, based at least in part on the connectivity request, a vendor network to be used by the application to send traffic;
    based at least in part on determining the vendor network, translating the connectivity request into a first format that is understandable by a controller of the vendor network, the first format being different from a second format that is understandable by a different controller of a different vendor network; and
    providing, to the controller of the vendor network, the connectivity request in the first format.

11. The method of claim 10, wherein the second format is incomprehensible by the controller of the vendor network.

12. The method of claim 10, wherein the API server is hosted as a web service that is external to the application orchestration system.

13. The method of claim 10, wherein the API server is accessible as an independent web service that is hosted within at least one of the controller of the vendor network or the different controller of the different vendor network.

14. The method of claim 10, wherein the API server is hosted within the application orchestration system as at least one of an operator or a virtual machine.

15. The method of claim 10, wherein the traffic is egress traffic of the application that is to be sent over the vendor network to a service relied upon by the application.

16. The method of claim 10, wherein the controller of the vendor network establishes a connection over the vendor network for the traffic based at least in part on being provided with the connectivity request in the first format.

17. The method of claim 10, wherein the vendor network is a software-defined wide area network and the controller of the vendor network is a software-defined networking controller.

18. The method of claim 10, wherein the connectivity request is received from at least one of a computing device associated with a developer of the application or the controller of the application orchestration system.

19. The method of claim 10, wherein the connectivity request includes at least one of:
    subnet information associated with the application;
    metadata associate with the application;
    compute cluster information;
    a domain name associated with a service to which the traffic is to be sent;
    an internet protocol address associated with the service; or
    a port associated with the service.

20. One or more non-transitory computer-readable media storing instructions that, when executed, cause one or more processors associated with an application programming interface (API) server to perform operations comprising:

receiving, at an application programming interface (API) server, a connectivity request associated with an application that is to be hosted on an application orchestration system, wherein the request is received from an agent of the API server that is configured to monitor a controller of the application orchestration system for received connection request objects;

determining, based at least in part on the connectivity request, a vendor network to be used by the application to send traffic to an external service relied upon by the application;

based at least in part on determining the vendor network, translating the connectivity request into a first format that is understandable by a controller of the vendor network, the first format being different from a second format that is incomprehensible by the controller but understandable by a different controller of a different vendor network; and providing, to the controller of the vendor network, the connectivity request in the first format.

* * * * *